United States Patent
Kawasaki et al.

(10) Patent No.: US 7,458,576 B2
(45) Date of Patent: Dec. 2, 2008

(54) SHEET MATERIAL INFORMATION DETECTION DEVICE AND SHEET MATERIAL PROCESSING APPARATUS

(75) Inventors: Takehiko Kawasaki, Kamakura (JP); Norio Kaneko, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/950,800

(22) Filed: Dec. 5, 2007

(65) Prior Publication Data

US 2008/0141791 A1 Jun. 19, 2008

(30) Foreign Application Priority Data

Dec. 15, 2006 (JP) .............................. 2006-338674

(51) Int. Cl.
*B65H 7/02* (2006.01)
*G01L 5/04* (2006.01)
*G03G 15/00* (2006.01)

(52) U.S. Cl. ................ 271/265.04; 73/159; 73/862.381; 399/45

(58) Field of Classification Search ................ 73/159, 73/862.381; 271/262, 265.04; 399/45; 356/238.1
See application file for complete search history.

(56) References Cited

U.S. PATENT DOCUMENTS

| | | | |
|---|---|---|---|
| 5,934,140 A | 8/1999 | Jackson et al. | |
| 6,866,263 B2 * | 3/2005 | Kawasaki | 271/262 |
| 7,152,861 B2 | 12/2006 | Kawasaki | 271/262 |
| 7,212,929 B2 * | 5/2007 | Kaneko et al. | 702/50 |
| 7,239,817 B2 | 7/2007 | Kaneko et al. | 399/45 |
| 7,296,795 B2 | 11/2007 | Kawasaki | 271/262 |
| 7,304,291 B2 | 12/2007 | Kawasaki et al. | 250/221 |
| 7,380,451 B2 * | 6/2008 | Kawasaki et al. | 73/159 |
| 7,422,208 B2 * | 9/2008 | Kawasaki et al. | 271/225 |
| 2004/0070142 A1* | 4/2004 | Kawasaki | 271/262 |
| 2005/0040587 A1* | 2/2005 | Kawasaki | 271/100 |
| 2005/0087010 A1* | 4/2005 | Nojiri et al. | 73/159 |
| 2005/0271403 A1* | 12/2005 | Kaneko et al. | 399/44 |
| 2006/0016996 A1* | 1/2006 | Kaneko et al. | 250/339.1 |
| 2006/0022400 A1 | 2/2006 | Kawasaki et al. | 271/227 |
| 2006/0054842 A1* | 3/2006 | Kawasaki et al. | 250/559.04 |
| 2006/0139667 A1* | 6/2006 | Morimoto et al. | 358/1.9 |
| 2006/0275045 A1 | 12/2006 | Kawasaki et al. | 399/45 |
| 2006/0276946 A1* | 12/2006 | Kaneko et al. | 701/45 |
| 2007/0023996 A1* | 2/2007 | Kawasaki | 271/262 |
| 2007/0036567 A1 | 2/2007 | Kawasaki et al. | 399/45 |
| 2008/0001348 A1 | 1/2008 | Kawasaki et al. | 271/259 |

FOREIGN PATENT DOCUMENTS

| | | |
|---|---|---|
| JP | 10-152245 | 6/1998 |
| JP | 2002-310866 | 10/2002 |

\* cited by examiner

*Primary Examiner*—Edward Lefkowitz
*Assistant Examiner*—Jonathan Dunlap
(74) *Attorney, Agent, or Firm*—Fitzpatrick, Cella, Harper & Scinto

(57) ABSTRACT

A sheet material information detection device has an external force applicator that applies an external force to a sheet material, a drive unit that drives the external force applicator, and an external force detector that detects through the sheet material the external force applied by the external force applicator. The drive unit produces motion vectors in at least two directions including a direction perpendicular to a surface of the sheet material.

7 Claims, 2 Drawing Sheets

SHEET MATERIAL INFORMATION DETECTION DEVICE AND SHEET MATERIAL PROCESSING APPARATUS

BACKGROUND OF THE INVENTION

1. Field of the Invention

The present invention relates to a sheet material information detection device that detects information about the characteristics of a sheet material such as a sheet material used as a medium for image formation. The present invention also relates to a sheet material processing apparatus that controls the processing of a sheet material in accordance with that detected information.

2. Description of the Related Art

In recent years, there has been an increasing need for improved quality (improved image quality, increased processing speed, etc.) of image forming apparatuses (electro photographic apparatuses such as laser beam printers and copiers, ink jet printers, etc.). Meanwhile, the types of sheet materials used have become more diversified according to the requirements of users who use such apparatuses and the environment in which such apparatuses are used. Therefore, sheet material processing apparatuses need to cope with diverse types of sheet materials.

Japanese Patent Laid-Open No. 10-152245 discloses a system that determines characteristics such as type and physical properties of a sheet material by measuring the behavior of members that are brought into contact with the sheet material passing there between and regulates the settings of a printer in accordance with the determined type and characteristics. Japanese Patent Laid-Open No. 2002-310866 discloses a sheet material information detection device that applies an impact force to a sheet material and measures the physical properties of the sheet material in accordance with the compressibility of the sheet material.

A sheet material processing apparatus often performs a plurality of steps including a step for conveying a sheet material and a step for fixing colorants. In the step for conveying a sheet material, for example, a sheet material is conveyed by using a pair of rollers or the like. In this step, the sheet material is subjected to two concurrent loads: a load in the compressing direction applied when the sheet material is nipped between the rollers, and a load in the conveying direction applied when the rollers nipping the sheet material there between rotate. In order to optimally control the step for conveying a sheet material, the following pieces of information need to be obtained simultaneously: information about characteristics of the sheet material in the compressing direction (e.g. information about thickness, compressibility, and the like in a direction perpendicular to the sheet material surface), and information about characteristics of the sheet material in the conveying direction (e.g. information about coefficient of friction, presence of bumps/recesses, and the like in a direction parallel to the sheet material surface). Simultaneously obtaining information about characteristics of the sheet material in different directions is also needed for controlling toner transfer from a transfer roller performed in electro photographic apparatuses and for controlling a heating/compressing process performed in fixing devices, although the types of necessary information vary. Therefore, in order to optimally control a sheet material processing apparatus, it is necessary to simultaneously obtain information about characteristics of a sheet material in different directions including at least a direction perpendicular to the surface of the sheet material.

However, in the above-described known system and device, which can detect sheet material information in one direction, it is difficult to detect sheet material information in different directions.

SUMMARY OF THE INVENTION

The present invention provides a sheet material information detection device that can obtain information about characteristics of a sheet material in different directions, including at least a direction perpendicular to the surface of the sheet material, thereby enabling optimum control of a sheet material processing apparatus. The present invention also provides a sheet material processing apparatus that can optimally control its operational processes in accordance with such sheet material information.

According to a first aspect of the invention, a sheet material information detection device is provided that detects and outputs sheet material information. The device includes an external force applicator that applies an external force to a sheet material, a drive unit that drives the external force applicator, and an external force detector that detects through the sheet material the external force applied by the external force applicator. In this device, the drive unit produces motion vectors in at least two directions including a direction perpendicular to a surface of the sheet material.

According to a second aspect of the invention, a sheet material information detection device is provided that detects and outputs sheet material information. The device includes an external force applicator that applies an external force to a sheet material, a drive unit that drives the external force applicator, and an external force detector that detects through the sheet material the external force applied by the external force applicator. In this device, the drive unit produces motion vectors in at least two directions including a direction perpendicular to a surface of the sheet material, and the external force applicator includes a cam in contact with an edge of a plate which vertically moves on the external force applicator so as to compress a spring around the external force applicator.

According to a third aspect of the invention, a sheet material processing apparatus includes the sheet material information detection device according to the first aspect. This apparatus further includes a control circuit. In this apparatus, a condition for processing the sheet material is determined in accordance with the sheet material information provided by the sheet material information detection device.

Thus, a sheet material information detection device can obtain information about characteristics of a sheet material in different directions including at least a direction perpendicular to the surface of the sheet material, thereby enabling optimum control of a sheet material processing apparatus. Further, a sheet material processing apparatus can optimally control its operational processes in accordance with such sheet material information.

Further features of the present invention will become apparent from the following description of exemplary embodiments with reference to the attached drawings.

DESCRIPTION OF THE EMBODIMENTS

Figure 1:
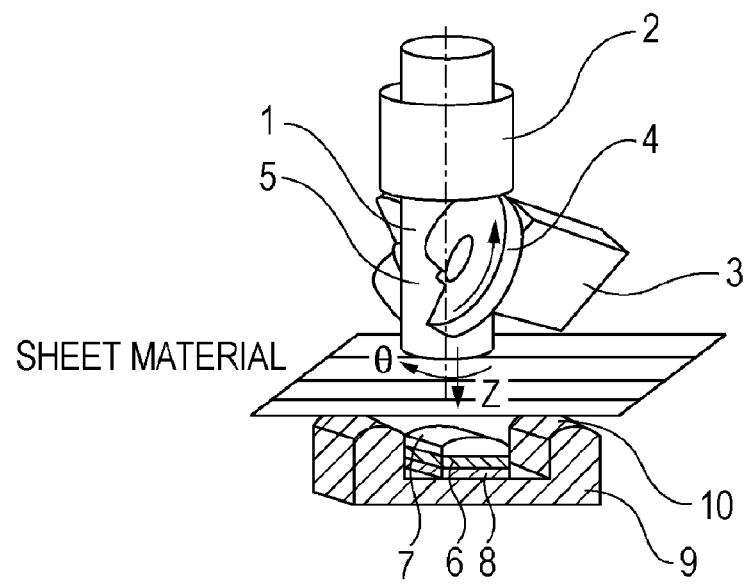
FIG. 1 is a perspective view of a sheet material information detection device according to a first embodiment of the present invention.

First, a sheet material information detection device according to an exemplary embodiment of the invention will be described.

In the exemplary embodiment of the invention, the term "sheet material" mainly includes sheet-type image-recording media such as paper (normal paper, glossy paper, coated paper, recycled paper, etc.), films composed of resin or the like, and overhead transparency (OHT) sheets. The sheet material may be in a form of sheets that are cut into predetermined dimensions, or rolls of sheets, but is not limited thereto. Moreover, the sheet material may also be a single sheet, or two or more sheets stacked and bonded together. Hereinafter, a sheet material cut into predetermined dimensions is taken as an example unless otherwise specified.

In the exemplary embodiment of the invention, sheet material information includes physical properties, shapes, and associated information about a sheet material necessary for processing the sheet material. Specifically, sheet material information includes, for example, thickness, density, modulus of elasticity, viscosity, vibration characteristics, presence of bumps/recesses, surface roughness, state of deformation, strength, susceptibility to elastic/plastic deformation, and the amount of extension. Also important are the type of deformation (extension, curvature, collapse, breakage, fold, or the like), transmittance, state of curl, and permeability of air or liquid. In the case of paper sheet material, information about nonuniformity in fibers, basis weight, coating, and the like is also included. Other paper sheet material information includes information about preformed images, adhesion of foreign substances, contamination, folds at edges or other portions, type of performed processing such as cutting or punching, state of lamination or coating, presence of staples. It is also important to detect whether a plurality of media are pasted in a direction parallel to the surface of a medium, or whether two or more media completely or partially overlap with each other.

In the exemplary embodiment of the invention, pieces of information about characteristics of a sheet material in different directions including at least a direction perpendicular to the surface of the sheet material are obtained to perform multiple analyses of such information necessary for processing the sheet material. In particular, information about characteristics of the sheet material in the compressing direction (for example, information about thickness, compressibility, and the like in a direction perpendicular to the surface of the sheet material) and information about characteristics of the sheet material in the conveying direction (for example, information about friction, presence of bumps/recesses, and the like in a direction parallel to the surface of the sheet material) can be obtained simultaneously.

In the exemplary embodiment of the invention, sheet material information is detected by applying an external force to a sheet material and obtaining information about the applied force through the sheet material. Specifically, a sheet material is struck by an external force applicator having motion vectors in at least two directions including a direction perpendicular to the surface of the sheet material. In the exemplary embodiment of the invention, detecting the applied external force through a sheet material means detecting the effect of the applied external force on a sheet material by obtaining information about the sheet material. In one case, a force transmitted through a sheet material to an external force detector is detected. In another case, a deformation of a sheet material due to the applied external force is detected by the external force detector.

The sheet material information detection device in the exemplary embodiment of the invention includes an external force applicator that applies an external force to a sheet material, a drive unit that drives the external force applicator, and an external force detector that detects through the sheet material the external force applied by the external force applicator. The drive unit produces motion vectors in at least two directions including a direction perpendicular to the surface of the sheet material.

Now, the main components of the sheet material information detection device according to the exemplary embodiment of the invention will be described, together with preferred embodiments.

1. External Force Applicator

Application of an external force is performed by striking a sheet material with the external force applicator having a certain mass at an appropriate velocity and acceleration. The material, shape, mass, impact velocity and acceleration of the external force applicator are appropriately determined according to the type and size of the detected area of the target sheet material. Exemplary features of the external force applicator in detecting sheets used in a copier or the like (normal paper, coated paper, bond paper, recycled paper, and resin sheets including OHT sheets) will be described below.

The material and shape of the external force applicator can minimize abrasion and plastic or elastic deformation due to impact with the sheet material or contact accompanying the impact, and can exhibit a toughness sufficiently high not to cause cracking. Specifically, the external force applicator is made of a metal material such as stainless steel, and has a spherical or bar shape, for example, having a curved surface on its end that is made to impact with the sheet material, i.e., a head. With the curved head surface, stable impact is achieved even when the impact angle is changed by vibration of the external force applicator or the sheet material at the time of impact. Accordingly, the head of the external force applicator becomes less locally abraded and more evenly abraded. The head of the external force applicator may include a flat portion. By striking a sheet material at the flat portion, the struck region of the sheet material is more evenly compressed, whereby errors due to nonuniformity in the characteristics of the sheet material are reduced.

The mass and impact velocity and acceleration (herein, the term "acceleration" means "the percentage change in velocity") of the external force applicator are appropriately determined in view of the stiffness of the sheet material within a range that the external force applicator does not produce an indentation or the like in the sheet material. Exemplary settings in the case of detection of a sheet used in the above-mentioned copiers and the like are a mass of about 1 g to 10 g and an impact velocity of about 0.1 m/s to 1 m/s. Additionally, the impact acceleration is as small as possible so as to achieve impact at a stable velocity even if the length of the striking motion of the external force applicator changes because of variations in the thickness of the sheet material, the fixation accuracy of the sheet material information detection device, or the like. For example, the acceleration, i.e., the percentage change in velocity, is 5% or smaller per motion length of 1 mm, or more specifically 1% or smaller, though it may vary with the impact velocity. Calculation for reducing acceleration is performed by appropriately offsetting the acceleration of an accelerator against the acceleration/deceleration of gravity and deceleration due to resistance such as friction.

Such application of an impact as an external force may be performed either once or a plurality of times for each information detection. Further, an impact may be applied to a plurality of locations at a time or at time intervals. If an impact is applied a plurality of times, external forces equivalent to each other can be applied so as to calculate the average output for accuracy improvement. Alternatively, different external forces may be applied so as to detect different physical properties of the sheet material.

Further, additional mechanisms for bending and compressing the sheet material by the above-described external force application can also be provided. As a mechanism for bending the sheet material, a level gap in the form of a groove (concave) can be provided at a position opposing the external force applicator with the sheet material fed there between. As a mechanism for compressing the sheet material, a receiver for receiving the external force through the sheet material can be provided at a position opposing the external force applicator with the sheet material fed there between. Such a groove structure and a receiver may be formed integrally or separately. Bending of the sheet material may be performed by singly or doubly supporting the sheet material, or by sinking a portion of the sheet material. Alternatively, an external force detection mechanism may be directly attached to the external force applicator so as to detect the repulsive force of the sheet material. In such a case, the receiver is not necessary.

2. External Force Detector

In the exemplary embodiment of the invention, the external force detector detects the effect of an applied external force on the sheet material by obtaining information about the sheet material. Examples of such a unit include a pressure-sensitive element that detects the force transmitted through the sheet material, and a displacement measurement unit that detects deformation of the sheet material subjected to an external force.

As a pressure-sensitive element, any of the following elements capable of detecting pressure or acceleration is suitably used: a piezoelectric element, a piezoresistive element, a capacitance-operated acceleration sensor, a magnetic sensor, and the like. The pressure-sensitive element can perform detection by directly having contact with the sheet material. However, a medium such as air may be present between the pressure-sensitive element and the sheet material.

As the displacement measurement unit, an optical unit that detects the reflecting direction and transmittance of light emitted from a light source can be used. The position and velocity in a certain portion of the sheet material may also be detected. Alternatively, a unit that additionally measures the temporal change (vibration) and spatial change (deformation) of the above-described items can be used.

3. Drive Unit

The drive unit drives the external force applicator with motion vectors in at least two directions including a direction perpendicular to the surface of the sheet material. In one case, the motion vectors can cause the external force applicator to undergo a linear motion and a twisting motion simultaneously when striking the sheet material. In another case, the motion vectors can cause the external force applicator to obliquely strike the sheet material at a certain offset angle with respect to the normal of the sheet material.

The drive unit may be any of a motor and a roller, a unit including a cam and a spring, an electromagnetic unit including a solenoid or the like, and a unit utilizing gravity, for example.

Next, the sheet material processing apparatus according to the exemplary embodiment of the invention will be described.

The sheet material processing apparatus in the exemplary embodiment of the invention is, for example, an apparatus that records characters, images, or the like on a sheet material. In recent image-forming apparatuses represented by copiers, laser beam printers, and ink jet printers, processes such as curl correction, stacking, binding-related processes such as sorting, punching, and stapling are also performed. Therefore, the processing performed by the sheet material processing apparatus covers the whole series of processes from when a medium is set therein until when the medium is output therefrom. Sheet material processing in the exemplary embodiment of the invention also includes reading of the contents recorded on the sheet material. The contents recorded on the sheet material may be images, characters, impressions, magnetically recorded data, data recorded on embedded elements, and the like, regardless of their types and forms.

Examples of the sheet material processing apparatus in the exemplary embodiment of the invention further include apparatuses that convey sheet materials and read information recorded thereon (so-called document scanners or the like), apparatuses that dispense bank notes, tickets, etc., and apparatuses that perform processes such as folding and punching of sheet materials.

The sheet material processing apparatus in the exemplary embodiment of the invention changes, adjusts, or controls conditions for processing the sheet material in accordance with the sheet material information obtained by the above-described sheet material information detection device. Exemplary processing conditions include conditions for image formation regarding transfer of colorants, represented by toner in electrophotographic apparatuses and ink in ink jet printers, to a medium. In other words, the sheet material processing apparatus adjusts image formation conditions by changing the image formation conditions or changing conditions for controlling image formation in accordance with sheet material information. For example, in the case of a sheet material having a small thickness, images are formed in a mode suitable for thin paper. In the case of a sheet material having a large thickness, images are formed in a mode suitable for thick paper. Among various image formation conditions, items to be controlled include, in priority order, the amount of colorants to be transferred, such as the amount of toner to be supplied to the medium and the amount of ink adhesion, and conditions for fixing colorants, such as fixation temperature and fixation pressure.

However, sheet material processing conditions are not limited to conditions for adjusting image layout or conditions for transferring colorants.

The above-described sheet material processing conditions are determined by a processor that processes input data to determine the operation performed by the sheet material processing apparatus. The processor may be built in the sheet material processing apparatus according to the exemplary embodiment of the invention or may be substituted by an external computer or the like.

In the sheet material processing apparatus according to the exemplary embodiment of the invention, sheet materials are processed in accordance with sheet material processing conditions determined in the above-described manner.

First Embodiment

A sheet material information detection device according to a first embodiment of the invention will be described.

FIG. 1 schematically illustrates a sheet material information detection device of the first embodiment in a retracted position.

Components included in the sheet material information detection device will be described referring to FIG. 1. An external force applicator 1 is supported by a bearing 2. A drive unit includes a motor 3 and a roller 4. A portion of the roller 4 is cut to form a notch 5. A pressure-sensitive element 6, which constitutes an external force detector, is provided with a protective receiver 7 on its top and a buffer 8 on its bottom, and is attached to a seat 9 with the buffer 8 there between. The seat 9 includes supporting portions 10 for supporting a sheet material P. These components are controlled by a control circuit (not shown) and are supplied with driving power.

Operation of the sheet material information detection device of the first embodiment will be described briefly. The drive unit drives the external force applicator 1 to strike the sheet material P. The motion produced by the drive unit consists of not only the vector component of a linear motion perpendicular to the sheet material surface (in the Z direction) but also the vector component of a rotational motion in the twisting direction (the θ direction). That is, the motion includes a twisting component in the rotational direction (the θ direction). Under such circumstances, a force transmitted through the sheet material to the external force detector disposed opposing the external force applicator 1 with the sheet material P fed there between is detected.

Next, the configuration of the sheet material information detection device of the first embodiment will be described in detail.

First, the external force applicator 1 will be described. The external force applicator 1 includes a head (an end to be brought into contact with the sheet material P) and a stem that are formed as an integral part made of stainless steel, and has a cylindrical shape with its axis oriented in the Z direction. The surface of the head that is brought into contact with the sheet material P is processed into a spherical shape having a radius of 20 mm, and such that the entire surface of the head has a surface roughness equivalent to that of the target sheet material. The total mass of the external force applicator 1 is 4 g. The external force applicator 1 is supported at its stem by the bearing 2 in such a manner that the external force applicator 1 can undergo a linear motion and a twisting motion. The bearing 2 is made of a resin material, a fluorocarbon resin in the first embodiment, having low frictional resistance. The axis of the external force applicator 1 is substantially parallel to a direction (the Z direction) perpendicular to the sheet material surface.

In the first embodiment, the drive unit that drives the external force applicator 1 includes the motor 3 and the roller 4. The roller 4 is disposed at a predetermined offset angle with respect to the axis of the external force applicator 1 so as to give the external force applicator 1 a vector component of linear motion perpendicular to the sheet material surface (in the Z direction) and a vector component of rotational motion in the twisting direction (the θ direction). In the first embodiment, a portion of the roller 4 is cut to form the notch 5. At the time of an impact on the sheet material, the external force applicator 1 is only supported by the bearing 2, away from the roller 4. The drive unit is not necessarily limited to a single roller 4, but may include two rollers 4 at appropriate positions. With the two rollers 4 provided so as to sandwich and drive the external force applicator 1, the behavior of the external force applicator 1 can be stabilized. The motor 3 is a stepper motor. Rotation of the roller 4 starts from a static position (reference position) and is controlled in such a manner that the roller 4 stops rotating after being rotated by a predetermined angle and then returns to the static position. Application of an external force may be performed only once. However, two impacts are applied at different velocities in the first embodiment. The velocity of the first impact application is set to 0.5 m/s in the Z direction and 10 rad/s in the θ direction. The velocity of the second impact application is set to 0.25 m/s in the Z direction and 5 rad/s in the θ direction. These velocities set for the external force applicator 1 are controlled in accordance with the rotating speed of the motor 3. Additionally, the external force applicator 1 in the static position is positioned farthest from the sheet material P during application of an external force. That is, a single operation cycle starts when the roller 4 at the static position starts its rotation, followed by the first and second external force applications, and ends when the roller 4 returns to the static position. The time required for a single cycle is set to be 0.2 s. Further, the interval between the first and second external force applications is set to 0.1 s.

Next, the external force detector will be described. The external force detector is disposed opposing the external force applicator 1 with the sheet material fed there between. The external force detector includes the pressure-sensitive element 6 provided with the protective receiver 7 on its top, and is attached to the seat 9 with the buffer 8 provided there between. The seat 9 includes the supporting portions 10 for supporting a sheet material P. The pressure-sensitive element 6 is a piezoelectric element made of lead zirconate titanate (PZT) ceramic. The receiver 7 is made of stainless steel.

In detection of sheet material information, the sheet material P that has been brought into contact with the receiver 7 is subjected to a compressive force while being nipped between the external force applicator 1 and the receiver 7. Thus, the compressibility of the sheet material P is reflected in an output signal. For example, if the other characteristics of the sheet material P are substantially the same, the higher the shock absorption of the sheet material P against the compression is, the larger the deceleration of the external force applicator 1 becomes and therefore the smaller the detected external force becomes. Further, in the first embodiment, a twisting motion given to the external force applicator 1 causes the external force applicator 1 to rub against the surface of the sheet material. Thus, information about the sheet material surface is reflected in the output signal. That is, information such as the size and frequency of bumps/recesses on the sheet material surface is reflected in frequency components of the output signal.

There may be a predetermined gap between levels of the supporting portions 10 of the seat 9 and the receiver 7. With this level gap, the sheet material P is bent into the gap to come into contact with the external force detector. Thus, the bending stiffness, one characteristic of the sheet material P, is reflected in the output signal. If, for example, the other characteristics of the sheet material P are substantially the same, the larger the bending stiffness of the sheet material P is, the larger the deceleration of the external force applicator 1 becomes and therefore the smaller the detected external force becomes.

With reference to the output signal obtained as described above, various kinds of sheet material information are obtained on the basis of necessary analyses. The analyses include calculation of the peak value, half-peak width, and integrated value of the output, analysis of frequency components in the output waveform, and the like. In the first embodiment, plural pieces of sheet material information can be obtained by combining different kinds of analyses. Specifically, different kinds of analyses are performed for a single output signal (waveform), whereby plural pieces of sheet material information are calculated.

Thus, according to the first embodiment, a sheet material information detection device can be provided that is capable of obtaining information about characteristics of a sheet material in different directions including at least a direction perpendicular to the sheet material surface, thereby enabling optimum control of a sheet material processing apparatus.

Second Embodiment

A sheet material information detection device according to a second embodiment of the invention will be described. In the second embodiment, the external force applicator 1 obliquely strikes the sheet material P at a predetermined offset angle with respect to a direction normal to the sheet material P.

Figure 2:
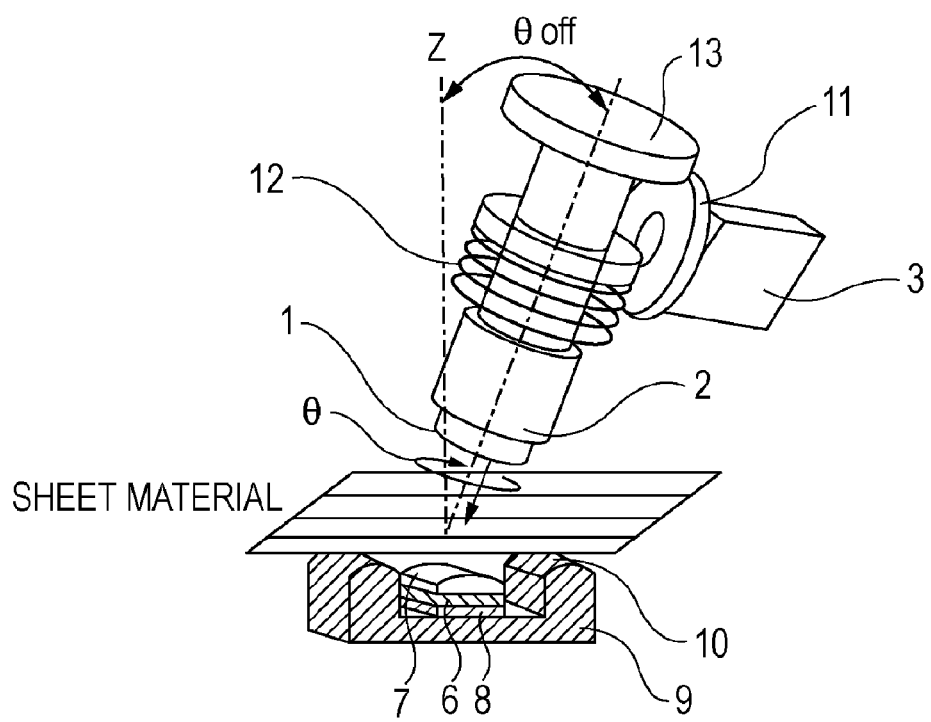
FIG. 2 is a perspective view of a sheet material information detection device according to a second embodiment of the present invention.

FIG. 2 shows the sheet material information detection device of the second embodiment. The external force applicator 1 is supported by the bearing 2. The drive unit includes the motor 3, a cam 11, and a striking spring 12. The cam 11 is in contact with the edge of a plate 13 and vertically moves the plate 13 provided on the stem of the external force applicator 1 so as to compress or stretch the striking spring 12. When the striking spring 12 is freed after being compressed or stretched, a motion is given to the external force applicator 1. The external force applicator 1 is tilted at a predetermined offset angle (θoff) with respect to a direction normal to the surface of the sheet material P (in the Z direction in FIG. 2) so as to obliquely strike the sheet material P. The other mechanisms are the same as those in the first embodiment.

Operation of the sheet material information detection device of the second embodiment will be described briefly. The drive unit drives the external force applicator 1 to strike the sheet material P. The motion produced by the drive unit consists of not only a vector component of linear motion perpendicular to the sheet material surface (in the Z direction) but also a vector component parallel to the surface of the sheet material P. The latter vector component is produced by tilting the external force applicator 1 at an offset angle. Under such circumstances, a force transmitted through the sheet material P to the external force detector disposed opposing the external force applicator 1 with the sheet material P fed there between is detected.

The velocities of external force application in the second embodiment are set to 0.5 m/s in the Z direction and 0.2 m/s in a direction parallel to the surface of the sheet material P, respectively. These velocities set for the external force applicator 1 are determined in accordance with the design of the striking spring 12 and the cam 11.

In the sheet material information detection device of the second embodiment, if a mechanism for compressing or stretching the striking spring 12 while twisting the striking spring 12 is provided, a vector component of a rotation in the θ direction can be additionally given to the external force applicator 1 at the time of freeing the striking spring 12. To achieve this, one end of the striking spring 12 is fixed to the external force applicator 1 and the other end is connected to a fixed member such as the bearing 2. Further, a spiral guide or the like is provided at a necessary position. In this manner, a mechanism for twisting the external force applicator 1 can be obtained.

Thus, according to the second embodiment, a sheet material information detection device can be provided that is capable of obtaining information about characteristics of a sheet material in different directions including at least a direction perpendicular to the sheet material surface, thereby enabling optimum control of a sheet material processing apparatus.

Further, according to the second embodiment, characteristics of the sheet material P in one direction parallel to the surface of the sheet material P can also be detected by applying an impact with a linear motion parallel to the surface of the sheet material P.

Third Embodiment

Figure 3:
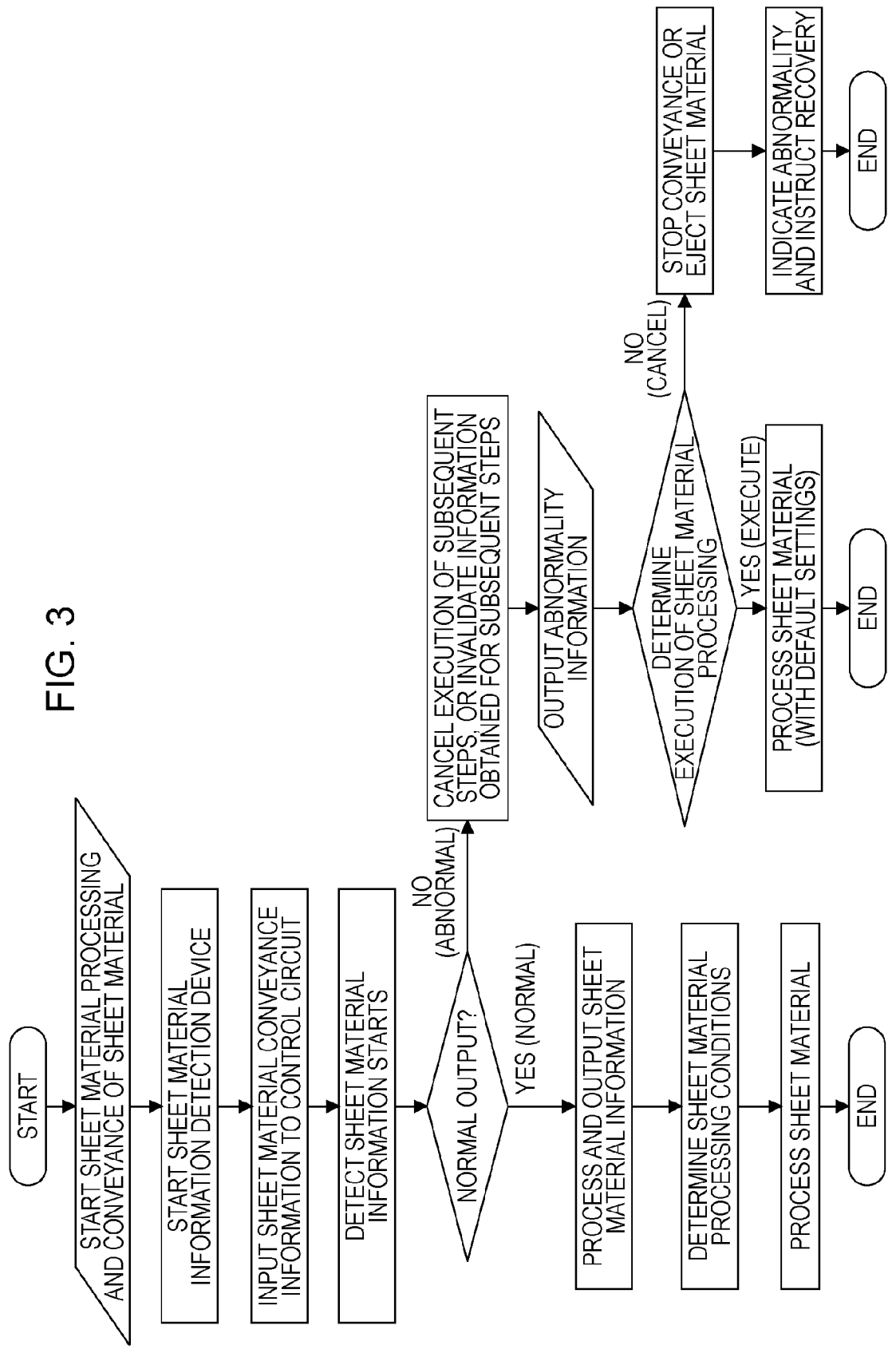
FIG. 3 is a flowchart of an operation performed by the sheet material processing apparatus according to a third embodiment of the invention.

A sheet material processing apparatus according to a third embodiment of the invention will be described. FIG. 3 is a flowchart of the operation performed by the sheet material processing apparatus of the third embodiment.

First, sheet material processing is started to start conveyance of a sheet material. The starting operation of sheet material processing is initiated when a user (operator) of the sheet material processing apparatus presses a start button provided on the apparatus body or issues an operation instruction from an external computer connected to the apparatus or from a peripheral apparatus such as a camera.

Next, the sheet material information detection device according to any of the embodiments of the invention starts its operation in response to the start of the sheet material processing by the sheet material processing apparatus including the sheet material information detection device.

Next, sheet material conveyance information is input to a control circuit of the sheet material information detection device. The sheet material conveyance information contains information regarding the position, velocity, and the like of the sheet material. That is, the conveyance information indicates the timing of the passage of a sheet material at a position where the sheet material information detection device is disposed. The timing for driving the sheet material information detection device (the timing of external force application and the like) is determined in accordance with the sheet material conveyance information. The sheet material conveyance information is generated on the basis of, for example, a signal of a sheet material passage sensor included in the sheet material processing apparatus, and information about the start of operation of the sheet material processing apparatus.

Next, in response to the sheet material conveyance information, detection of sheet material information starts.

After the start of the detection of sheet material information, the operation proceeds in different procedures depending on whether the output from the detection unit is normal or abnormal.

The case where the output is abnormal (NO) will be described. Abnormal output means that, for example, no output at a certain level is obtained within a predetermined time period after the start of operation. In this case, execution of the subsequent steps is canceled or information obtained for the subsequent steps is invalidated. Additionally, abnormality information indicating that the sheet material information detection device has an abnormality is output.

If the abnormality is determined to be less serious, the sheet material processing is not necessarily canceled. For example, after stopping the operation of the sheet material information detection device, the settings may be changed to default values to resume the operation. The abnormality is determined to be less serious when it is confirmed that conveyance of the sheet material is normally performed, or when the abnormality is a sudden and less-frequent occurrence during a series of repeated sheet material processings, for example. However, if the abnormality is determined to be serious, the sheet material processing is canceled. In this case, the conveyance is stopped or the sheet material is ejected, and then an indication of the abnormality in the sheet material processing apparatus or an instruction for recovery is performed appropriately. Additionally, expected influences on the next sheet material processing are examined accordingly and appropriate treatment is provided. Thus, the operation is completed.

Now, the case where the output is normal (YES) will be described. Detection of sheet material information is performed by the sheet material information detection device according to any of the embodiments of the invention. Next, conditions for sheet material processing are determined in accordance with the detected sheet material information. Subsequently, sheet material processing, such as image formation, is performed under the determined conditions. In the sheet material processing apparatus of the third embodiment, the type of processing is determined in accordance with sheet material information and each processing step is suitably controlled. In the sheet material processing apparatus of the third embodiment, control of processing related to sheet material conveyance is particularly important. For example, a very stiff sheet material is processed with a larger load applied by conveying rollers. Further, in view of the velocity dependence of mechanical characteristics for each sheet material, the velocity for applying a load is determined appropriately. That is, since sheet materials such as paper have both characteristics of elasticity and viscosity, their repulsive force, for example, varying with the velocity for applying a load, is utilized. Thus, the operation is completed.

As described above, according to the sheet material processing apparatus of the third embodiment, a sheet material processing apparatus can be provided that is capable of performing optimum control of processing steps in accordance with information about characteristics of a sheet material in different directions including at least a direction perpendicular to the sheet material surface.

While the present invention has been described with reference to exemplary embodiments, it is to be understood that the invention is not limited to the disclosed exemplary embodiments.

This application claims the benefit of Japanese Application No. 2006-338674 filed Dec. 15, 2006, which is hereby incorporated by reference herein in its entirety.

What is claimed is:

1. A sheet material information detection device that detects and outputs sheet material information, the device comprising:

an external force applicator that applies an external force to a sheet material;

a drive unit that drives said external force applicator; and an external force detector that detects through the sheet material the external force applied by said external force applicator, wherein said drive unit produces motion vectors in at least two directions including a direction perpendicular to a surface of the sheet material.

2. A sheet material information detection device according to claim 1, wherein the motion produced by said drive unit consists of a vector component of a linear motion perpendicular to the sheet material surface and a vector component of a rotational motion in a twisting direction.

3. The sheet material information detection device of claim 1, further comprising a bearing supporting said external force applicator, said bearing allowing linear motion and a twisting motion.

4. The sheet material information detection device of claim 1, further comprising a roller disposed at a predetermined offset angle with respect to the axis of said external force applicator.

5. A sheet material information detection device according to claim 1, wherein said drive unit is a stepper motor.

6. A sheet material information detection device that detects and outputs sheet material information, the device comprising:

an external force applicator that applies an external force to a sheet material;

a drive unit that drives said external force applicator; and an external force detector that detects through the sheet material the external force applied by said external force applicator, wherein said drive unit produces motion vectors in at least two directions including a direction perpendicular to a surface of the sheet material, and wherein said external force applicator includes a cam in contact with an edge of a plate which vertically moves on said external force applicator so as to compress a spring around said external force applicator.

7. A sheet material processing apparatus comprising the sheet material information detection device according to claim 1, further comprising a control circuit, wherein a condition for processing the sheet material is determined in accordance with the sheet material information provided by the sheet material information detection device.

* * * * *